Patented July 6, 1943

2,323,711

UNITED STATES PATENT OFFICE 2,323,711

WELDING ELECTRODE

Raymond J. Franklin, Chicago, Ill., assignor to Chicago Hardware Foundry Company, North Chicago, Ill., a corporation of Illinois No Drawing. Application July 20, 1942, Serial No. 451,671

11 Claims. (Cl. 219—8)

This invention relates to an electrode for use in metallic arc welding and pertains particularly to a coated electrode for welding cast iron.

It is an object of the present invention to provide a coated cast iron electrode for deposition by electric arc welding.

It is a further object of my invention to provide an electrode that is suitable for the production of cast iron welds that are equally as machinable as unwelded gray cast iron and that can be used for that purpose without preheating the base metal.

In many industrial operations it is desirable to weld gray cast iron with an electrode having a composition similar to that of gray cast iron. In many of these operations the weld deposits must subsequently be subjected to machining. Further, it is known that the deposition of cast iron weld metal by means of the electric arc offers many important physical and mechanical advantages over the deposition of cast iron weld metal by means of the oxy-acetylene torch.

However, it has been found that when ordinary cast iron electrodes are used to weld cast iron by the electric arc process, the physical structure of the resulting weld will not be that of gray cast iron and the weld will not be machinable unless the base metal has been heated to approximately 1000° F. just prior to welding. It will be apparent that such preheating of cast iron articles involves considerable expense and frequently serious mechanical or physical difficulties.

The preheating of gray cast iron before welding to about 1000° F. is carried out to prevent rapid cooling or chilling of the welded area. It is well known that the more slowly a given iron is cooled through the graphitization range, the more complete the graphitization will be. It has been generally accepted that the presence of appreciable amounts of cementite in welds made with ordinary electrodes on cast iron which had not been preheated is due to rapid chilling and consequent inhibition of graphitization. It is also known that when gray cast iron is welded by an electric arc, there is frequently a loss of carbon, silicon, and the like during the welding operation. The chemical composition of the weld may thus be changed so as to effect a retention of an appreciable percentage of iron carbide in the weld area. In any case, it is well known that ordinary cast iron electrodes will not produce a weld as machinable as the base iron unless the latter has been preheated to about 1000° F.

I have discovered that I can produce unusually high grade cast iron welds by means of the electric arc process with an electrode comprising a metallic core of iron containing an appreciable amount of graphite and having an adherent coating thereon containing phosphorus, carbon such as graphite and non-metallic slag forming material.

I have found that when cast iron welds are formed by the electrode of the present invention, both the weld metal and the metal in the zone adjacent thereto consist entirely of gray cast iron that is wholly free from areas or segregations of cementite which render machining difficult or impossible. I have further found that such machinable welds are produced without the preheating required in the case of ordinary cast iron electrodes. The cast iron base can be heated to some 300° F. to prevent cooling strains or the like, but such preheating is not required for the production of machinable welds.

The electrode of the present invention comprises a metallic core or support member comprising iron containing at least 1.85 percent graphitic carbon and covered by an adherent coating having the following composition:

| | |
|---|---|
| Carbon | 10 to 40 |
| Phosphorus | 7½ to 30 |
| Slag forming material | 10 to 60 |

It will be understood that the respective percentages refer to what may be termed the dry or solid ingredients of the coating. It will be further understood that a binder is necessary to bond the components of the coating and to render the coating adherent to the metallic core. Various agglutinating materials can be used for a binder, for instance, sodium silicate, glue, water soluble resins and gums, and the like. It will also be understood that the coating can be applied to the surface of the metallic core by any of the conventional methods such as dipping or extrusion.

In manufacturing my electrode, I generally prefer to use gray cast iron as material for the metallic core. I have found, however that I can obtain entirely satisfactory results by using as the support member or core any material composed predominantly of iron and containing more than 1.85 percent carbon. I have also found that the ferrous core material may contain alloying elements such as nickel, molybdenum, titanium, or copper. As an illustration, I have successfully used iron having the following range of analysis:

| | Percent |
|---|---|
| Carbon | 3.25 to 3.50 |
| Silicon | 2.75 to 3.00 |
| Manganese | 0.05 to 0.07 |
| Phosphorus | 0.05 to 0.75 |
| Sulfur | 0.08 maximum |

In compounding the coating, I usually prefer to employ graphite to supply the carbon required. I have found that natural graphites containing various amounts of impurities are entirely satisfactory. The carbon can also be supplied by other carbonaceous materials, although graphite generally gives the best results.

The better results, obtained when the carbon in the adherent coating is supplied in the form of graphite, are probably to be attributed to an inoculation of the weld metal by the graphite which serves to initiate and accelerate graphitization of the weld metal.

The mere provision of graphite or other forms of carbon in the adherent coating is not by itself sufficient to insure graphitization of the weld metal. Graphitization is effected, however, when the adherent coating also contains from 7½ to 30 percent phosphorus. About 15 percent phosphorus is preferred. This phosphorus is preferably included in the form of an alloy such as ferro-phosphorus containing 18 or 25 percent phosphorus. The phosphorus can also be added in the form of alloys with boron, chromium, cobalt, copper, manganese, molybdenum, nickel, titanium, silicon, or vanadium. Part of the phosphorus can be introduced as an alloy with one metal, another part as an alloy with another metal. Beneficial results have also been obtained by including, along with the phosphorus, one or more of the above mentioned metals or elements. In particular, tittanium may be included in amounts up to 2 percent; copper, in amounts up to 4 or 5 percent; and nickel, in amounts up to 4 or 5 percent. When such additions are made, the amount of phosphorus in the welding rod may be reduced somewhat.

Phosphorus, it is believed, reduces the melting point of the weld metal and serves to increase the fluidity of the weld metal at the temperatures of the electric arc. This high degree of fluidity is thought to make possible rapid inoculation of the weld metal by the graphite or other carbon in the electrode coating.

The welds made with my electrodes often contain something like 2 percent phosphorus. Normally, a phosphorus content on this order would weaken cast iron appreciably, yet the welds made by means of my electrodes are strong. Further, my electrodes can contain chromium, titanium, or zirconium in amounts such as to effect weld metal contents of these metals ranging up to 1½ percent without bad effects, in spite of the fact that these metals, when present in amounts as small as ½ percent, ordinarily would form carbides that would render the metal too hard for machining. The reason why such surprisingly large phosphorus, chromium, titanium, and zirconium contents can be introduced into the weld metal by using the electrodes of this invention may possibly be super-heating phenomena occurring at the elevated temperatures of the electric arc. Or posssibly the tendency to graphitization is so strong as to counteract the results normally obtained by the introduction of large amounts of phosphorus, chromium, titanium, or zirconium. In any case, the results obtained when alloying metals are introduced into the weld metal by electric arc welding are not comparable to the results obtained when the same metals are introduced into cast iron at the lower temperatures prevailing in conventional cupolas.

The slag-forming constituent of the coating is largely melted by the heat of the arc during welding, forming a residual slag which covers the solidified and soldifying metal. Therefore, I prefer to use as slag material an oxygen containing compound of one or more metals which will form a slag having suitable physical characteristics for the welding operation.

I have found that oxygen containing compounds of metals selected from the group consisting of calcium, aluminum, magnesium, and barium are particularly suitable for use as the principal slag forming component of my electrode. As an illustration, I can use calcium carbonate in the form of marble flour; aluminum silicates such as feldspar or kaolin; magnesium carbonate or magnesium silicate, and barium carbonate. It will be understood that there are numerous other slag forming ingredients which are equally suitable.

When it is desirable to have a slag which is more fluid than that produced by the essential components of the coating, I have found I can add a minor amount of another slag forming ingredient for the purpose of increasing the fluidity. Thus, I can add a minor amount of a second slag forming ingredient up to approximately 20 percent of the total weight of the coating without in any way adversely affecting the valuable properties and characteristics of my electrode. I have found that fluorides of sodium, calcium, or lithium are suitable for such additions. For example, I can add up to 20 percent of fluorspar to the coating for the purpose of increasing fluidity. It should be understood, however, that such secondary material is a minor slag forming ingredient and that the percentage included should always be less than the percentage of the major essential slag forming ingredient present.

The following are examples of some of the coatings which I have found to be satisfactory in the manufacture of the electrode of the present invention:

| | Percent |
|---|---|
| 1. Powdered marble | 25 |
| Ferro phosphorus (25% P) | 60 |
| Graphite | 15 |
| 2. Powdered marble | 26 |
| Fluorspar | 14 |
| Ferro phosphorus (25% P) | 40 |
| Graphite | 20 |
| 3. Barium carbonate | 26 |
| Flurospar | 14 |
| Ferro phosphorus (25% P) | 40 |
| Graphite | 20 |
| 4. Feldspar | 25 |
| Lithium fluoride | 5 |
| Ferro phosphorus (25% P) | 50 |
| Graphite | 20 |

I have found that welds made with my present electrode on gray cast iron which has not been preheated are entirely free from cementite or other hard and non-machinable carbide segregations. It will be understood that when the electrode is to be used for the welding of relatively heavy sections of gray cast iron, that it is sometimes desirable to preheat the base metal to approximately 300° F., in order to eliminate the possibility of strains through the formation of a sharp temperature gradient. In such cases, however, the base metal should not be heated to a temperature higher than approximately 300°.

In all cases welds formed by the application of the electrode of the present invention consist of gray cast iron entirely free from segregations of cementite, and the weld deposit is characterized by a much finer grain structure than that normally found in gray cast iron. The fusion line between the base metal and weld metal is clearly defined, and entirely free from a zone or layer of cementite. The hardness of the base metal and the weld metal are substantially the same. Numerous observations indicate that in general the actual weld metal is some 15 to 35 Brinell numbers harder than the base metal. This is apparently due entirely to the finer grain structure. The maximum hardness at the fusion line is never greater than the maximum hardness throughout the weld area.

The material advantages of the results which are produced with the electrode of the present invention will be apparent from the foregoing.

Many details of construction and composition may be varied within a wide range without departing from the principles of this invention and it is therefore not my purpose to limit the patent granted on this invention otherwise than necessitated by the scope of the appended claims.

I claim as follows:

1. An electrode for welding cast iron comprising a core predominantly of iron containing at least 1.85 percent carbon and having a coating thereon, said coating including 10 to 40 percent carbon, 7½ to 30 percent phosphorus, 10 to 60 percent slag forming material, and a binder.

2. An electrode for welding cast iron comprising a core predominantly of iron containing at least 1.85 percent carbon and having a coating thereon, said coating including 10 to 40 percent carbon, 7½ to 30 percent phosphorus in the form of an alloy with an element selected from the group consisting of iron, boron, chromium, cobalt, copper, manganese, molybdenum, nickel, titanium, silicon, and vanadium, 10 to 60 percent slag forming material, and a binder.

3. An electrode for welding cast iron comprising a core predominantly of iron containing at least 1.85 percent carbon and having a coating thereon, said coating including 10 to 40 percent carbon, 7½ to 30 percent phosphorus in the form of ferro-phosphorus, 10 to 60 percent slag forming material, and a binder.

4. An electrode for welding cast iron comprising a core predominantly of iron containing at least 1.85 percent carbon and having a coating thereon, said coating including 10 to 40 percent graphitic carbon, 7½ to 30 percent phosphorus in the form of an alloy, 10 to 60 percent slag forming material, and a binder.

5. An electrode for welding cast iron comprising a core predominantly of iron containing at least 1.85 percent carbon and having a coating thereon, said coating including 10 to 40 percent graphitic carbon, 7½ to 30 percent phosphorus in the form of ferro-phosphorus, 10 to 60 percent slag forming material, and a binder.

6. A welding electrode comprising a cast iron core containing from 1.85 to 3.5 percent carbon and having a coating thereon containing about 10 to 40 percent graphitic carbon, about 7½ to 30 percent phosphorus in alloy form and a sufficient amount of slag forming material capable under the conditions obtaining in electric arc welding of aiding in the introduction of phosphorus and carbon into the weld to produce a weld of gray cast iron.

7. A welding electrode comprising a cast iron core containing from 1.85 to 3.5 percent carbon and having a coating thereon containing about 10 to 40 percent graphitic carbon, about 7½ to 30 percent phosphorus in alloy form and a sufficient amount of slag forming material including an oxygen-containing compound of metal selected from the group consisting of calcium, aluminum, magnesium and barium capable under the conditions obtaining in electric arc welding of aiding in the introduction of phosphorus and carbon into the weld to produce a weld of gray cast iron, said coating ingredients being held together with a binder.

8. A welding electrode comprising a cast iron core containing at least 1.85 percent carbon and having a coating thereon containing about 10 to 40 percent carbon, about 7½ to 30 percent phosphorus in the form of an alloy, a substantial amount of copper ranging up to 5 per cent, from 10 to 60 percent slag forming material, and a binder.

9. A welding electrode comprising a cast iron core containing at least 1.85 percent carbon and having a coating thereon containing about 10 to 40 percent carbon, about 7½ to 30 percent phosphorus in the form of an alloy, a substantial amount of titanium ranging up to 2 percent, from 10 to 60 percent slag forming material, and a binder.

10. A welding electrode comprising a cast iron core containing at least 1.85 percent carbon and having a coating thereon containing about 10 to 40 percent carbon, about 7½ to 30 percent phosphorus in the form of an alloy, a substantial amount of nickel ranging up to 5 percent, from 10 to 60 percent slag forming material, and a binder.

11. A welding electrode comprising a cast iron core containing at least 1.85 percent carbon and having a coating thereon containing about 10 to 40 percent carbon, about 7½ to 30 percent phosphorus in the form of an alloy, a substantial amount of a metal selected from the group consisting of copper ranging up to 5 percent, titanium ranging up to 2 percent and nickel ranging up to 5 percent, from 10 to 60 percent slag forming material, and a binder.

RAYMOND J. FRANKLIN.